(No Model.)
L. J. MUNDELIN.
NIPPLE HOLDING MACHINE.
No. 468,304. Patented Feb. 2, 1892.
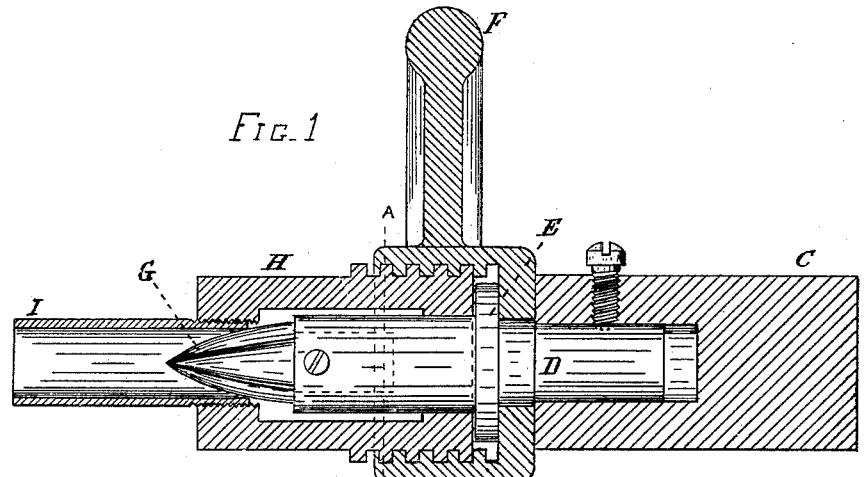
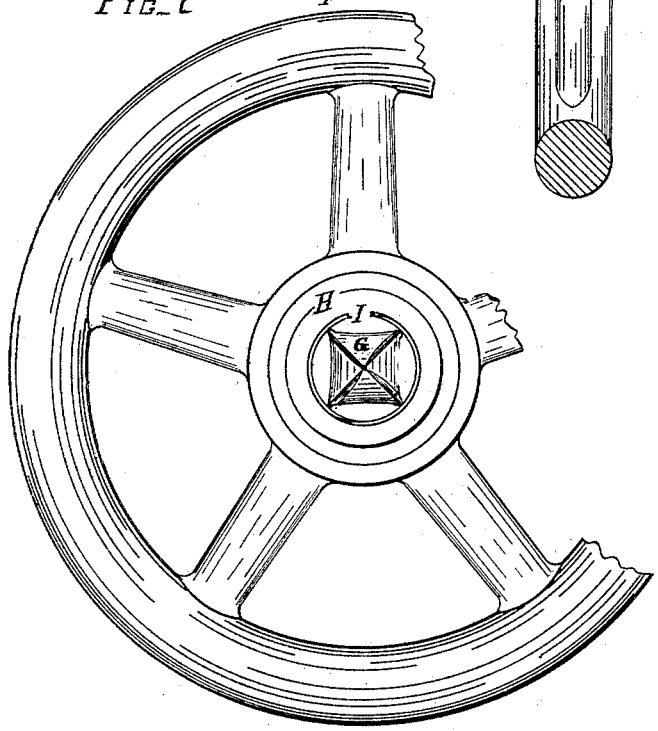
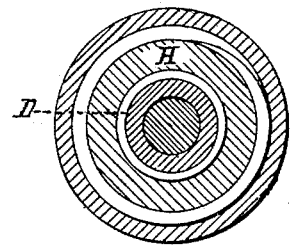
WITNESSES:
George A. Thornton
James White
Louis Jesse Mundelin INVENTOR
BY
Lewis E. Osborn ATTORNEY.
THE NORRIS PETERS CO., PHOTO-LITHO., WASHINGTON, D. C.

UNITED STATES PATENT OFFICE.

LOUIS JESSE MUNDELIN, OF NEW HAVEN, CONNECTICUT.

NIPPLE-HOLDING MACHINE.

SPECIFICATION forming part of Letters Patent No. 468,304, dated February 2, 1892.

Application filed June 29, 1891. Serial No. 397,846. (No model.)

*To all whom it may concern:*

Be it known that I, LOUIS JESSE MUNDELIN, a citizen of the United States, residing at New Haven, in the county of New Haven and State of Connecticut, have invented a new and useful Nipple-Holding Machine, of which the following is a specification.

My invention relates to improvements in machines for holding pieces of wrought-iron pipe technically known as "nipples" while undergoing the operation of cutting right or left hand screw-threads on the ends of the same. I attain these objects by the mechanism illustrated in the accompanying drawings, in which—

Figure 1 is a vertical section of the entire machine; Fig. 2, a front view of the same, showing hand-wheel and spurred conical-shaped holder; Fig. 3, a vertical section of a part of the machine on the line A B, Fig. 1.

Similar letters refer to similar parts throughout the several views.

The metal shank C, Fig. 1, may be constructed in either square or cylindrical form, depending upon its use as a vise-tool or a machine-tool. This shank is bored centrally to receive the chuck D, Fig. 1, and is provided with a set-screw to hold the same. On this chuck is turned the shoulder E for the purpose of preventing the hand-wheel F from moving longitudinally on the chuck D while being turned. The chuck D is bored to receive the pointed cone-shaped tool G, which has upon its cone-shaped end sharp longitudinal spurs, as shown. The hub of the hand-wheel F is provided internally with a screw-thread to receive the sleeve H, which is threaded to correspond. This sleeve is bored at its threaded end to slide longitudinally on the chuck D when the hand-wheel F is turned, and at its opposite end is tapped to receive the piece of pipe I, as shown. When the hand-wheel F is turned in a direction to project the sleeve H outwardly by the action of the screw, the sleeve is in a position to receive the nipple. The motion of the hand-wheel is then reversed and the inner surface of the nipple is drawn with great force onto the spur-teeth of the conical holder, firmly holding it for the threading of the outer end of the same.

I am aware that prior to my invention nipple-holders have been constructed to hold the nipples by pressure against the internal surface of the pipe constituting the nipple; but I am not aware that they have ever been constructed to draw the pipe onto a sharpened holder by the action of a screw or its equivalent.

Therefore what I do claim as my invention, and desire to secure by Letters Patent, is—

The combination, in a nipple-holding machine, of a shank C, chuck D, provided with shoulder E, hand-wheel F, with internally-threaded hub fitting between shoulder E and end of shank C, sleeve H, with outer diameter threaded to enter the hub of the hand-wheel F, and cone-shaped tool with longitudinal spurs projecting through the outer end of the sleeve H, which is tapped to receive the nipple, all substantially as set forth.

LOUIS JESSE MUNDELIN.

Witnesses:
GEORGE C. SCRANTON,
JAMES WHITE.